United States Patent
Allard et al.

[11] Patent Number: 6,043,887
[45] Date of Patent: Mar. 28, 2000

[54] POLARIMETER

[76] Inventors: Louis B. Allard, Apt. 407-280 Brittany Drive, Ottawa, Ontario, Canada, K1K 4M4; Robert I. MacDonald, 6452 Clingin Lane, Manotick, Ontario, Canada; Carey M. Garrett, 54 Fernbrook Place, Kanata, Ontario, Canada, K2M 2L8

[21] Appl. No.: 09/200,439

[22] Filed: Nov. 27, 1998

[51] Int. Cl.[7] .................................................. G01J 4/00
[52] U.S. Cl. ............................................. 356/364; 356/365
[58] Field of Search .................................... 356/364, 367, 356/369, 365

[56] References Cited

U.S. PATENT DOCUMENTS

| | | | |
|---|---|---|---|
| 5,102,222 | 4/1992 | Berger et al. | 356/367 |
| 5,371,597 | 12/1994 | Favin et al. | 356/367 |
| 5,815,270 | 9/1998 | Lee | 356/367 |

*Primary Examiner*—Frank G. Font
*Assistant Examiner*—Tu T. Nguyen
*Attorney, Agent, or Firm*—Neil Teitelbaum & Associates

[57] ABSTRACT

The state of polarization of an input light beam is tested by determining four components of a Stokes vector of the light. These correspond to components of the light in three polarization states, $S_1$: linear horizontal, $S_2$: linear at 45 degrees, $S_3$: right circularly polarized, and $S_0$ the total power. It is not necessary to filter out these components directly and measure their powers. In accordance with this invention it is more convenient to measure the powers in three arbitrary polarization states that have known relationships to each other, and, also measure the total power. The actual Stokes vector components is calculated from this information. Conveniently, a device having three polarization beam splitting surfaces and a prism provides a novel way in which to obtain the necessary information from an input beam so that a set of equations can be solved to determine the state of polarization the input beam.

17 Claims, 6 Drawing Sheets

FIGURE 1

PRIOR ART

Fig. 3b end view

POLARIMETER

FIELD OF THE INVENTION

This invention relates to an optical circuit and method for measuring the state of polarization (SOP) of an input beam of light. The acronyms SOP and S.o.P. have been used interchangeably through this specification.

BACKGROUND OF THE INVENTION

As the demand for longer transmission distances and higher information transfer rates for optical fibre communication increases, so does the importance of measuring the state of polarization of light within an optical fibre. The transfer properties of some optical devices such as polarization dependent isolators, couplers and optical amplifiers depend on the polarization state of light launched into them. To completely characterize these devices, the relationship of the input and output states of polarization (SOP) of the optical system must be known.

One known way of measuring the SOP of a light beam is to align a waveplate and a linear polarizer in the optical path of the beam. The waveplate is rotatable about the optical axis and typically is a quarter-wave plate. An optical sensor, a photodetector, is positioned to measure the intensity of light transmitted by the waveplate and polarizer. In operation the waveplate is sequentially rotated to a minimum of four angular positions about the optical axis relative to the linear polarizer and the transmitted light intensity is measured at each position by the photodetector. A disadvantage of this method is the mechanical movement of the waveplate and the resulting slow speed of measurement. Additionally, since every optical element has to align in free space, miniaturization of such a device in not possible.

Figure 1:
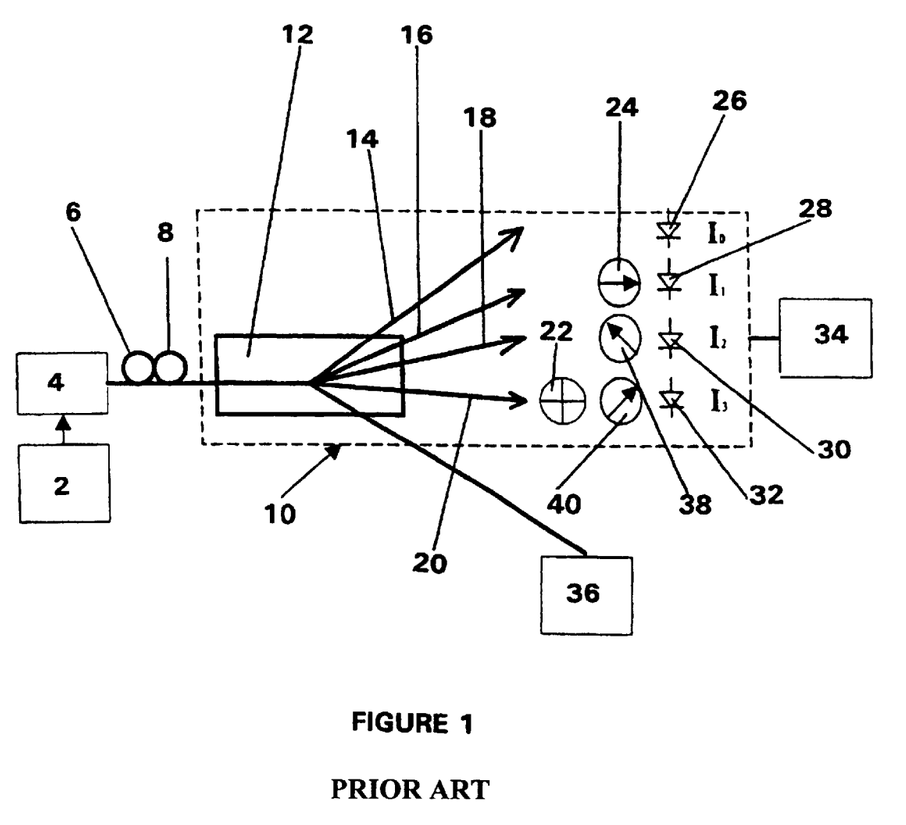
FIG. 1 is a prior art schematic diagram of an in-line fiber optic polarimeter using a 1×5 star coupler.

Several polarimeters are described in U.S. Pat. No. 5,815,270 in the name of Lee, entitled IN-LINE FIBER-OPTIC POLARIMETER USING A FUSED 1×5 STAR COUPLER. Lee's polarimeter shown in prior art FIG. 1, and other prior art polarimeters as well, depend on splitting a beam of light through a splitter and passing the sub-beams into three polarizing fibres. In FIG. 1 a single beam launched into a 1×5 star coupler provides sub-beams to three polarizers 22, 38, and 40. In Lee's disclosure, polarizing fibres are utilized. Although Lee's device performs its intended function, this and other devices based on using a plurality of polarizers are not particularly efficient since only a fraction of the light in each of three beams being launched into respective polarizers 22, 38, and 40 in Lee's device is utilized. Stated differently, each detector at the output of a polarizer is only detecting a fraction of the light launched into a polarizer, and hence, a considerable amount of energy is wasted.

It is an object of this invention to provide an optical circuit and method for determining the SOP which conserves energy, wherein most of the input light is directed to the detectors.

In contrast to the prior art devices, the method and circuit does not "spill or reject" much of the light launched into the polarimeter. Most of the light under test in accordance with this invention is utilized, and advantageously, less light is required.

SUMMARY OF THE INVENTION

In accordance with the invention, a method is provided of determining a state of polarization of a beam of light comprising the steps of:
providing a first beam;
providing an optical system for splitting the beam of light in a polarization dependent manner and for polarizing at least a split portion of the beam and for retarding a split portion of the beam;
dividing the first beam into two sub-beams;
dividing each of the two sub-beams into two further sub-beams to obtain four sub-beams of light, wherein at least the dividing of the first beam or the dividing of the two sub-beams is performed in a polarization dependent manner;
passing a first of the four sub-beams of light through a polarizing element to obtain a first polarized beam of light;
passing a second of the four sub-beams of light to a phase retarding element for altering relative phase between orthogonal components of the second of the four sub-beams of light and subsequently passing said beam through a polarizing element to obtain a second polarized beam of light;
detecting the intensity of the first polarized beam, the second polarized beam, and the two remaining sub-beams of; and,
in dependence upon the detected intensities and properties of the optical system determining the state of polarization of the input beam.

In accordance with the invention there is further provided, a method of determining a state of polarization of a beam of light comprising the steps of:
providing a first beam;
providing an optical system for splitting the first beam of light and for polarizing at least a split portion of the beam and for phase retarding a split portion of the beam;
dividing the first beam into two sub-beams;
dividing each of the two sub-beams into two further sub-beams to obtain four sub-beams of light dividing the first beam into two sub-beams;
dividing each of the two sub-beams into two further sub-beams to obtain four sub-beams of light, wherein at least the dividing of the first beam or the dividing of the two sub-beams is performed in a polarization dependent manner;
causing a phase retardation in at least one of the sub-beams;
detecting the intensity of the each of the four sub-beams; and,
in dependence upon the detected intensities solving a system of equations that characterize the optical system to determine the state of polarization of the input beam.

In accordance with another aspect of the invention there is provided a device for measuring the state of polarization of a first beam of light comprising an optical system including:
a) a first beam splitter for dividing the first beam into two sub-beams;
b) a second beam splitter for dividing each of the two sub-beams into two further sub-beams to obtain four sub-beams of light, wherein at least the first or the second beam splitter is for splitting a beam into two beams in a polarization dependent manner;
c) a phase retarding interface for phase retarding at least one of the sub-beams of light, and the device comprising
d) detectors for detecting the intensity of the sub-beams of light; and, e) electronic processing means coupled with the detectors for solving a system of equations that characterize an aspect of the optical system to determine the state of polarization of the input beam in dependence upon the detected intensities.

Yet still further in accordance with said other aspect of the invention a device is provided for measuring the state of polarization of an input beam of light comprising:

a) a beam splitting interface for dividing the first beam into two sub-beams $\alpha_1$ and $\alpha_2$ in a polarization dependent manner;

b) a beam splitting interface for dividing the sub-beam $\alpha_1$ into two further sub-beams $\beta_1$ and $\beta_2$ in a polarization dependent manner;

c) a beam splitting interface for dividing the sub-beam $\alpha_2$ into two further sub-beams $\gamma_1$ and $\gamma_2$ in a polarization dependent manner;

d) a phase retarding interface for phase retarding the sub-beam $\alpha_2$;

e) detectors for detecting the intensity of the sub-beams of light $\beta_1$, $\beta_2$, $\gamma_1$, $\gamma_2$; and, f) electronic processing means coupled with the detectors for solving a system of equations that characterize an aspect of the input light to determine the state of polarization of the input beam in dependence upon the detected intensities.

Advantageously, the device in accordance with the invention comprises three beam splitting cubes directly coupled to one another absent any air gaps.

BRIEF DESCRIPTION OF THE DRAWINGS

Exemplary embodiments of the invention will now be described in conjunction with the drawings in which.

DETAILED DESCRIPTION

Figure 2:
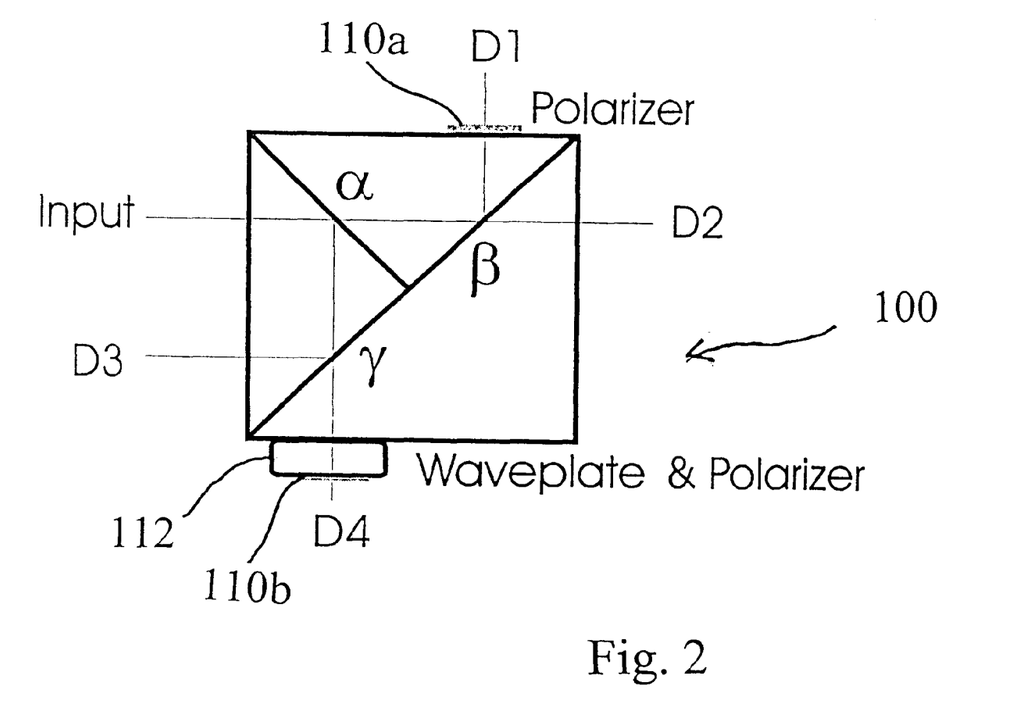
FIG. 2 is a device (absent processing means) in accordance with the invention for determining the state of polarization of an input beam of light.

Referring now to FIG. 2, a device 100 is shown in the form of a beam splitting cube having a polarizer 110a at a first output port and having a waveplate 112 and polarizer 110b at another output port. Adjacent the beam splitting cube's four output ports are photodetectors D1 to D4 for detecting the intensity of light incident upon them. The beam splitting cube is comprised of three triangular sections forming three interfaces $\alpha$, $\beta$, and $\gamma$.

A measure of the SOP and the degree of polarization (DOP) for light propagating through the device 100 is calculated by using a Mueller matrix formalism. The DOP of a light wave is defined as the ratio of polarized power to total power contained in a light beam and a mathematical expression is give below.

First, the Jones matrix representation of the polarization-affecting element is provided and subsequently, this matrix is transformed into the Mueller realm following the procedure given in "*Introduction to Matrix Method in Optics*" by A. Gerrard and J. M. Burch, Dover Publications, Inc.; the procedure is summarized below.

Let $J = \begin{pmatrix} J_{11} & J_{12} \\ J_{21} & J_{22} \end{pmatrix}$ be a Jones matrix and $G = \begin{pmatrix} G_{11} & G_{12} \\ G_{21} & G_{22} \end{pmatrix}$ the complex conjugate of the transpose of J.

The Mueller matrix equivalent of $J$ is $$M = \begin{pmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{pmatrix} \text{ with}$$

$$M_{11} = (G_{11}J_{11} + G_{21}J_{21} + G_{12}J_{12} + G_{22}J_{22})/2$$

$$M_{12} = (G_{11}J_{11} + G_{21}J_{21} - G_{12}J_{12} - G_{22}J_{22})/2$$

$$M_{13} = (G_{11}J_{12} + G_{21}J_{22} + G_{12}J_{11} + G_{22}J_{21})/2$$

$$M_{14} = i(G_{11}J_{12} + G_{21}J_{22} - G_{12}J_{11} - G_{22}J_{21})/2$$

$$M_{21} = (G_{11}J_{11} + G_{12}J_{12} - G_{21}J_{21} - G_{22}J_{22})/2$$

$$M_{22} = (G_{11}J_{11} + G_{22}J_{22} - G_{21}J_{21} - G_{12}J_{12})/2$$

$$M_{23} = (G_{12}J_{11} + G_{11}J_{12} - G_{22}J_{21} - G_{21}J_{22})/2$$

$$M_{24} = i(G_{11}J_{12} + G_{22}J_{21} - G_{21}J_{22} - G_{12}J_{11})/2$$

$$M_{31} = (G_{11}J_{21} + G_{21}J_{11} + G_{12}J_{22} + G_{22}J_{12})/2$$

$$M_{32} = (G_{11}J_{21} + G_{21}J_{11} - G_{12}J_{22} - G_{22}J_{12})/2$$

$$M_{33} = (G_{11}J_{22} + G_{21}J_{12} + G_{12}J_{21} + G_{22}J_{11})/2$$

$$M_{34} = i(G_{11}J_{22} + G_{21}J_{12} - G_{12}J_{21} - G_{22}J_{11})/2$$

$$M_{41} = i(G_{21}J_{11} + G_{22}J_{12} - G_{11}J_{21} - G_{12}J_{22})/2$$

$$M_{42} = i(G_{21}J_{11} + G_{12}J_{22} - G_{11}J_{21} - G_{22}J_{12})/2$$

$$M_{43} = i(G_{21}J_{12} + G_{22}J_{11} - G_{11}J_{22} - G_{12}J_{21})/2$$

$$M_{44} = (G_{22}J_{11} + G_{11}J_{22} - G_{12}J_{21} - G_{21}J_{12})/2$$

The approach utilized considers reflection and transmission at the $\alpha$, $\beta$, and $\gamma$ interfaces. Let $r_p$, $r_s$, $t_p$ and $t_s$ be the Fresnel reflection and transmission coefficients at those interfaces for p- and s-polarized lightwaves respectively.

The Jones reflection matrix is $$J_R = \begin{pmatrix} -r_p & 0 \\ 0 & r_s \end{pmatrix} \text{ and } J_T = \begin{pmatrix} t_p & 0 \\ 0 & t_s \end{pmatrix} \text{ is the Jones}$$

transmission matrix, (matrices defined as in "Introduction to Modern Optics" $2^{nd}$ Ed., Grant R. Fowles, Dover Publications Inc.). By following the prescription above we obtain their Mueller equivalent:

$$M_R = \begin{pmatrix} R_+ & R_- & 0 & 0 \\ R_- & R_+ & 0 & 0 \\ 0 & 0 & R & 0 \\ 0 & 0 & 0 & R \end{pmatrix} \text{ and}$$

$$M_T = \begin{pmatrix} T_+ & T_- & 0 & 0 \\ T_- & T_+ & 0 & 0 \\ 0 & 0 & T & 0 \\ 0 & 0 & 0 & T \end{pmatrix} \text{ with } X_+ = \frac{x_p^2 + x_s^2}{2},$$

$$X_- = \frac{x_p^2 - x_s^2}{2}, R = -r_p r_s, \text{ and } T = t_p t_s. \ X \text{ is either } R \text{ or } T.$$

Now considering the device 100 of FIG. 2:

The Mueller matrices relating the state of polarization (SOP) at detector $D_i$ to the input SOP, with no polarizer or waveplate present would be:

$$M_{D_1} = M_{R_\beta} M_{T_\alpha}$$
$$M_{D_2} = M_{T_\beta} M_{T_\alpha}$$
$$M_{D_3} = M_{R_\gamma} M_{R_\alpha}$$
$$M_{D_4} = M_{T_\gamma} M_{R_\alpha}$$

If we now consider the general SOP $(S_0\ S_1\ S_2\ S_3)^1$ and multiply it by the above four matrices we obtain the SOP at each output, assuming no polarizers or waveplate.

$$\text{S.o.P.}(D_1) = \begin{pmatrix} S_0 A + S_1 B \\ S_0 B + S_1 A \\ S_2 C \\ S_3 C \end{pmatrix}, \ \text{S.o.P.}(D_2) = \begin{pmatrix} S_0 D + S_1 E \\ S_0 E + S_1 D \\ S_2 F \\ S_3 F \end{pmatrix},$$

$$\text{S.o.P.}(D_3) = \begin{pmatrix} S_0 G + S_1 H \\ S_0 H + S_1 G \\ S_2 I \\ S_3 I \end{pmatrix} \text{ and S.o.P.}(D_4) = \begin{pmatrix} S_0 J + S_1 K \\ S_0 K + S_1 J \\ S_2 L \\ S_3 L \end{pmatrix}.$$

The symbols are defined as $$A = R_+^\beta T_+^\alpha + R_-^\beta T_-^\alpha$$
$$B = R_-^\beta T_+^\alpha + R_+^\beta T_-^\alpha$$
$$C = R^\beta T^\alpha$$
$$D = T_+^\beta T_+^\alpha + T_-^\beta T_-^\alpha$$
$$E = T_-^\beta T_+^\alpha + T_+^\beta T_-^\alpha$$
$$F = T^\beta T^\alpha$$
$$G = R_+^\gamma R_+^\alpha + R_-^\gamma R_-^\alpha$$
$$H = R_-^\gamma R_+^\alpha + R_+^\gamma R_-^\alpha$$
$$I = R^\gamma R^\alpha$$
$$J = T_+^\gamma R_+^\alpha + T_-^\gamma R_-^\alpha$$
$$K = T_-^\gamma R_+^\alpha + T_+^\gamma R_-^\alpha$$
$$L = T^\gamma R^\alpha.$$

Consequently, the powers measured at the detectors in the absence of a polarizer or waveplate are functions solely of $S_0$ and $S_1$ which implies that the DOP of the lightwave which is defined as $\text{D.o.P.} = \dfrac{\sqrt{\sum_{i=1}^{3} S_i^2}}{S_0}$ cannot be calculated.

The Mueller matrix representation of a linear polarizer oriented at 45° is $$\text{Pol}(45°) = \frac{1}{2} \begin{pmatrix} 1 & 0 & 1 & 0 \\ 0 & 0 & 0 & 0 \\ 1 & 0 & 1 & 0 \\ 0 & 0 & 0 & 0 \end{pmatrix} \text{ and that of a quarter waveplate oriented at}$$

$$0° \text{ is } \frac{\lambda}{4}(0°) = \begin{pmatrix} 1 & 0 & 0 & 0 \\ 0 & 1 & 0 & 0 \\ 0 & 0 & 0 & 1 \\ 0 & 0 & -1 & 0 \end{pmatrix}.$$

Consequently, adding the polarizer 110*a* just before $D_1$ yields $$\text{Pol}(45°) \begin{pmatrix} S_0 A + S_1 B \\ S_0 B + S_1 A \\ S_2 C \\ S_3 C \end{pmatrix} = \frac{1}{2} \begin{pmatrix} S_0 A + S_1 B + S_2 C \\ 0 \\ S_0 A + S_1 B + S_2 C \\ 0 \end{pmatrix},$$

i.e. the power now measured is $P_1 = \dfrac{1}{2}(S_0 A + S_1 B + S_2 C)$.

If we add the quarter waveplate 112 at the output near detector 4 we have a new SOP given by:

$$\frac{\lambda}{4}(0°) \begin{pmatrix} S_0 J + S_1 K \\ S_0 K + S_1 J \\ S_2 L \\ S_3 L \end{pmatrix} = \begin{pmatrix} S_0 J + S_1 K \\ S_0 K + S_1 J \\ S_3 L \\ -S_2 L \end{pmatrix}.$$

Finally, including a linear polarizer 100*b* at 45° at the output of the waveplate 112 yields $$\text{Stokes vector} \frac{1}{2} \begin{pmatrix} S_0 J + S_1 K + S_3 L \\ 0 \\ S_0 J + S_1 K + S_3 L \\ 0 \end{pmatrix}.$$

To summarize, the beamsplitter having interfaces $\alpha$, $\beta$, and $\gamma$ with polarizers 110*a*, 110*b* and waveplate 112 depicted above allows the detectors to measure $$P_1 = \frac{1}{2}(S_0 A + S_1 B + S_2 C)$$
$$P_2 = S_0 D + S_1 E$$
$$P_3 = S_0 G + S_1 H$$
$$P_4 = \frac{1}{2}(S_0 J + S_1 K + S_3 L).$$

Of course, the system of four equations and four unknowns can now be solved and SOP and the DOP can be calculated.

For the arrangement of the beam splitting interface shown in the exemplary embodiment of FIG. 2, the following conditions should be met.

$R_p=r_p^2$, $R_s=r_s^2$ for all interfaces.

If $R_p \neq R_s$ for all beamsplitting interfaces and $R_{pors} \neq 0$ for all interfaces the set of four equations above can be solved.

Let $R_p^\alpha = R_s^\alpha$ i.e. the first interface splits light in a polarization independent manner. This implies that $R_-^\alpha = T_-^\alpha = 0$. In order to be able to solve our set of four equations above, it is required that $C \neq 0$ and $L \neq 0$ which translates into neither p- nor s-reflectivities being zero for both beta and gamma interfaces.

Furthermore, it is required that B, or E, or H, or K be different from zero. This implies that we must have $R_p^\beta \neq R_s^\beta$ or $R_p^\gamma \neq R_s^\gamma$.

Let $R_p^\beta = R_s^\beta$ i.e. the beta interface splits light in a polarization independent manner. This implies that $R_-^\beta = T_-^\beta = 0$. In order to be able to solve our set of four equations we require that $C \neq 0$ and $L \neq 0$ which translates into neither p- nor s- reflectivities being zero for both alpha and gamma interfaces.

Furthermore, it is required that B, or E, or H, or K be different from zero. This implies that we must have $R_p^\alpha = R_s^\alpha$ or $R_-^\gamma R_+^\alpha + R_+^\gamma R_-^\alpha \neq 0$.

Let $R_p^\gamma = R_s^\gamma$ i.e. the gamma interface splits light in a polarization independent manner. This implies that $R_-^\gamma = T_-^\gamma = 0$. In order to be able to solve our set of four equations we require that $C \neq 0$ and $L \neq 0$ which translates into neither p- nor s- reflectivities being zero for both alpha and beta interfaces.

Furthermore, it is required that B, or E, or H, or K be different from zero. This implies that we must have $R_-^\beta T_+^\alpha + R_+^\beta T_-^\alpha \neq 0$ or $R_p^\alpha \neq R_s^\alpha$.

Of course there are numerous other exemplary configurations that can be envisaged within the scope of this invention which have not been shown for which a different set of conditions apply.

Figure 3A:
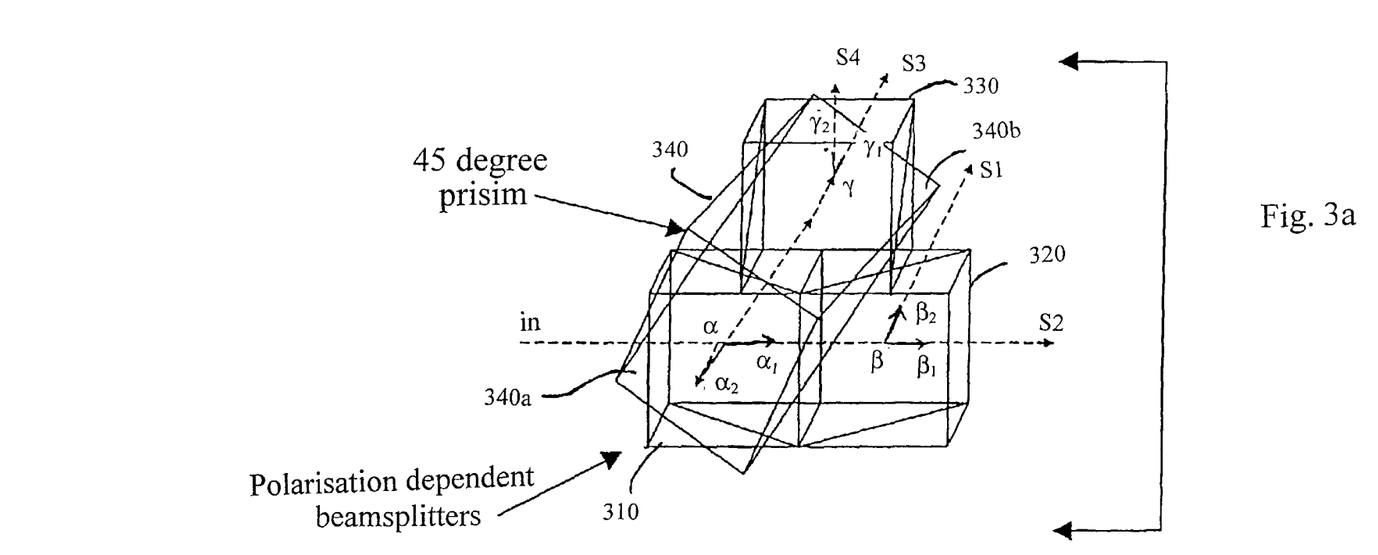
FIGS. 3a and 3b are views of an alternative embodiment of the device shown in FIG. 2 in accordance with the invention.
Figure 3B:
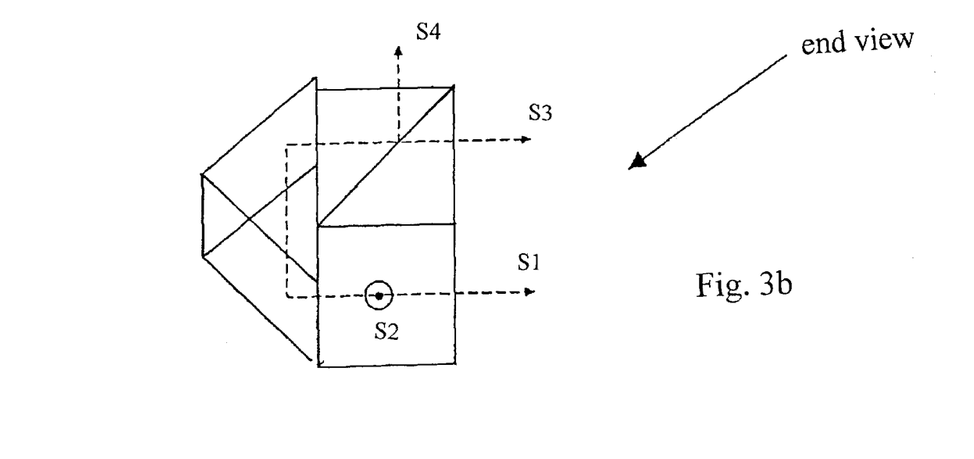

Referring now to FIGS. 3a and 3b, an alternative embodiment of the invention is shown, which obviates the requirement for the inclusion of the polarizers 110a, 110b, and the waveplate 112. Prior to considering the embodiment of FIG. 3a and 3b, FIG. 4 is provided as simplified schematic diagram to illustrate some of the functional requirements of the device shown in FIGS. 3a and 3b which achieves this end.

Figure 4:
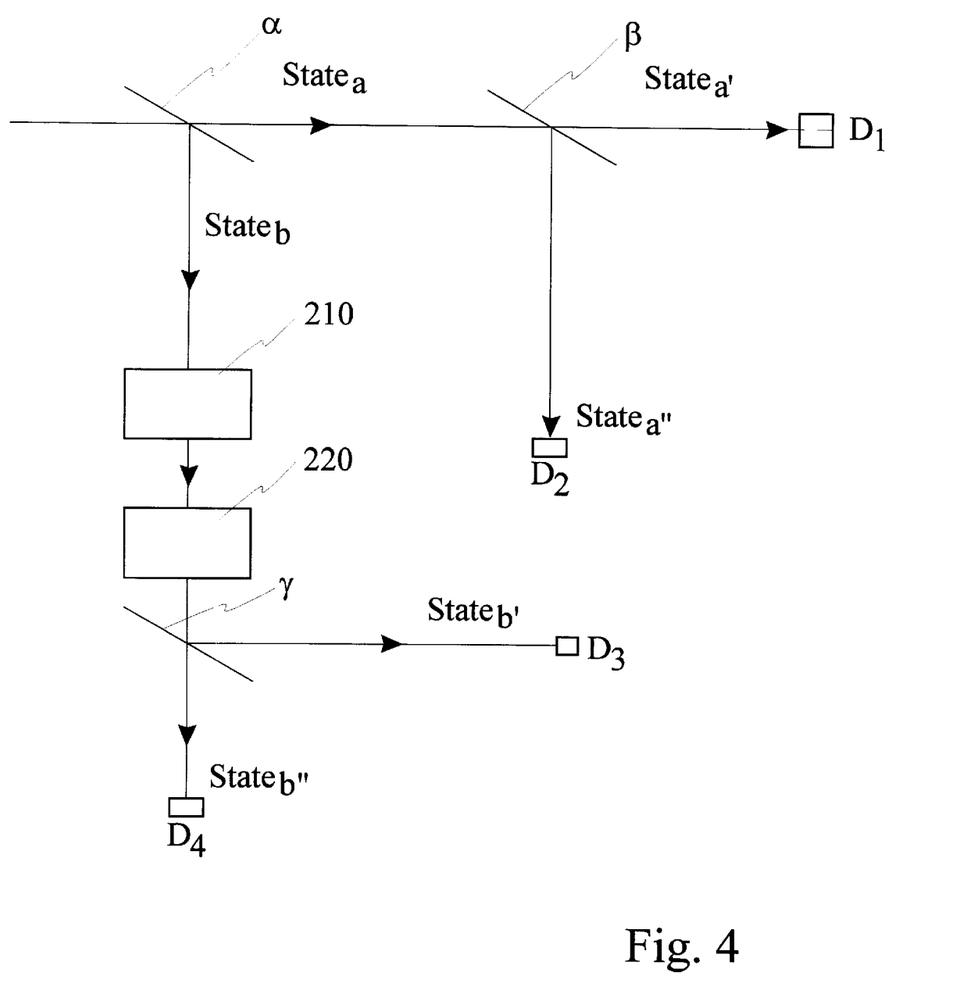
FIG. 4 is a schematic diagram illustrating some of the requirements embodiments of this invention, shown for illustrative purposes.

FIG. 4 includes three polarization beam splitting interfaces, denoted by α, β, and γ. Further included is a reflecting surface 210 that reflects the beam propagating from the interface α in state b in such a way that the plane of incidence of surface 210 with the beam is not coplanr with the plane of incidence of the reflection at the interface α. Preferably the reflection at surface 210 defines parallel (p) and perpendicular (s) components of polarization that are at an angle of 45 degrees to the components p and s defined by the reflection at the surface 210. Rotation of the principle components of polarization between reflections is required in order for the equation to be solvable. In the embodiment shown if FIG. 2, phase retardation is achieved by passing a sub-beam through a quarter waveplate, however the embodiment of FIG. 3a and 3b achieves sufficient phase retardation by reflecting the beam off two prism faces via total internal reflection.

Figure 5:
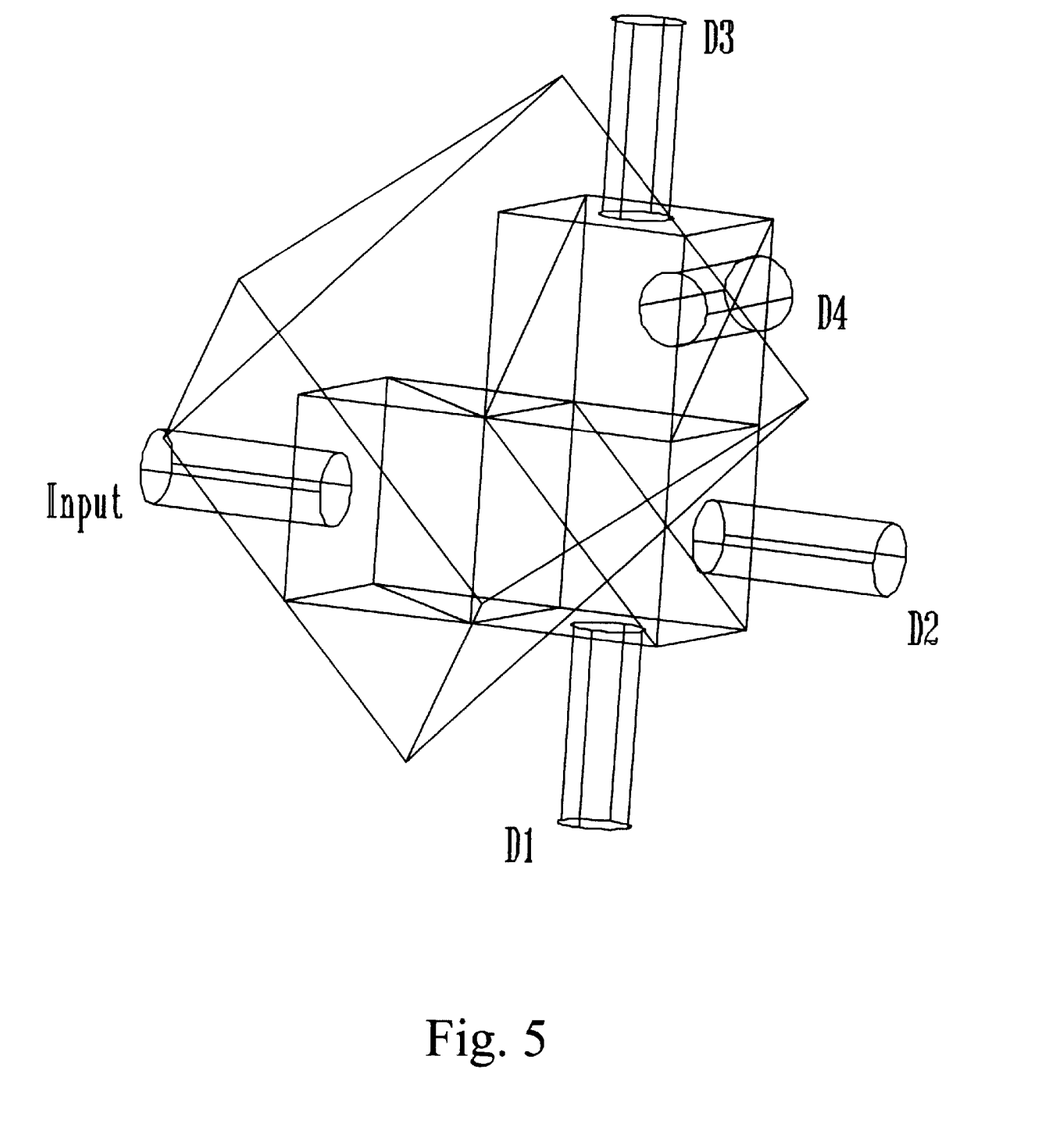
FIG. 5 is a more detailed view of the embodiment of the invention shown in FIGS. 3a and 3b, and, FIG. 6 is a detailed view of an alternative embodiment of the invention.

Turning now to FIG. 3a, a device is shown having three beam splitting cubes 310, 320, and 330, having beam splitting interfaces α, β, γ, respectfully. The interfaces are selected such that light impinging upon any interface α, β, γ is not split into beams having exactly the same polarization components; Contacting the beam splitting cubes 310 and 330 is a prism 340 disposed at an angle of approximately 45 degrees to the beam splitting cubes. This rotation of, for example 45 degrees is necessary in order to have enough information to solve the set of equations. In operation, an input beam is input into an end of the polarization beam splitting cube (BSC) 310. The input beam is split in a polarization dependent manner into sub-beams $\alpha_1$ and $\alpha_2$. Sub-beam $\alpha_1$ propagates along a straight through path end enters the BSC 320 wherein it splits in a polarization dependent manner into sub-beams $\beta_1$ and $\beta_2$. Sub-beam $\alpha_2$ enters the prism 340 and is reflected two time. The prism is oriented in such a manner as to cause the sub-beam $\alpha_2$ propagating therein, to be reflected in two different planes of incidence. The prism is tilted, in this instance by 45 degrees to ensure that the beam reflects in two different planes of incidence from a first face 340a in a first plane incidence and subsequently a second face 340b in a second plane of incidence of the prism 340 and enters the beam splitting cube 330 where it is separated into two sub-beams $\gamma_1$ and $\gamma_2$ ($\gamma_1 \neq \gamma_2$) corresponding to S3 and S4 respectively. FIG. 5 shows a more complete detailed diagram of the device shown in FIGS. 3a and 3b in accordance with the invention. Of course the detectors indicated by symbols D1 through D4 must be coupled to a suitably programmed processor or computer to solver required system of equations.

The matrices linking the SOP at the various detectors to that at the input are given by $$M_{D_1} = M_{R_\beta} M_{T_\alpha}$$

$$M_{D_2} = M_{T_\beta} M_{T_\alpha}$$

$$M_{D_3} = M_{R_\gamma} M_{rot(+45°)} M_{ir}^2 M_{rot(-45°)} M_{R_\alpha}$$

$$M_{D_4} = M_{T_\gamma} M_{rot(+45°)} M_{ir}^2 M_{rot(-45°)} M_{R_\alpha}$$

Where $M_{rot(\theta)} = \begin{pmatrix} 1 & 0 & 0 & 0 \\ 0 & \cos^2\theta - \sin^2\theta & 2\sin\theta\cos\theta & 0 \\ 0 & -2\sin\theta\cos\theta & \cos^2\theta - \sin^2\theta & 0 \\ 0 & 0 & 0 & 1 \end{pmatrix}$ is the Mueller representation of the rotation matrix whose representation in Jones formalism is $$J_{rot(\theta)} = \begin{pmatrix} \cos\theta & \sin\theta \\ -\sin\theta & \cos\theta \end{pmatrix}.$$

The matrix representing a total internal reflection is expressed as $$J_{ir} = \begin{pmatrix} e^{-i\delta_p} & 0 \\ 0 & e^{-i\delta_s} \end{pmatrix}$$

which when multiplied by itself yields $$J_{ir}^2 = \begin{pmatrix} e^{i2\delta_p} & 0 \\ 0 & e^{i2\delta_s} \end{pmatrix}.$$

Expressed in Mueller formalism, the last matrix becomes $$M_{ir}^2 = \begin{pmatrix} 1 & 0 & 0 & 0 \\ 0 & 1 & 0 & 0 \\ 0 & 0 & \cos(2\Delta) & -\sin(2\Delta) \\ 0 & 0 & \sin(2\Delta) & \cos(2\Delta) \end{pmatrix} \text{ with } \Delta = \delta_p - \delta_s.$$

Below is a set of generalized equations for measuring polarization by interface reflections.

An unknown Stokes vector $S^o$ is passed through four optical elements with known polarisation transformations M to generate four new optical beams with Stokes vectors $S^i$ $$\begin{bmatrix} S_0^i \\ S_1^i \\ S_2^i \\ S_3^i \end{bmatrix} = M^i \begin{bmatrix} S_0^o \\ S_2^o \\ S_3^o \\ S_4^o \end{bmatrix}$$

The four power measurements $D^i$ are proportional to the first elements of the four Stokes vectors $S_0^i$ The elements $S_1^i$ are calculated from the top rows of the four Mueller matrices that correspond to the four polarization transformations leading to the four measurements $D^i$ $$kD_0^i = S_0^i = M_{1,1}^i S_0^o + M_{1,2}^i S_1^o + M_{1,3}^i S_2^o + M_{1,4}^i S_3^o$$

where k is a proportionality constant

This is a linear system of four equations that can be solved for the components of the unknown stokes vector $S^o$. Rewrite the equations as $$D_m^i = \Gamma_{mn} S_n^o$$

The matrix $\Gamma$ is a established by calibrating the device. The input Stokes polarisation vector is then determined by the matrix operation.

$$S_m^o = \Gamma_{mn}^{-1} D_n^i$$

Figure 6:
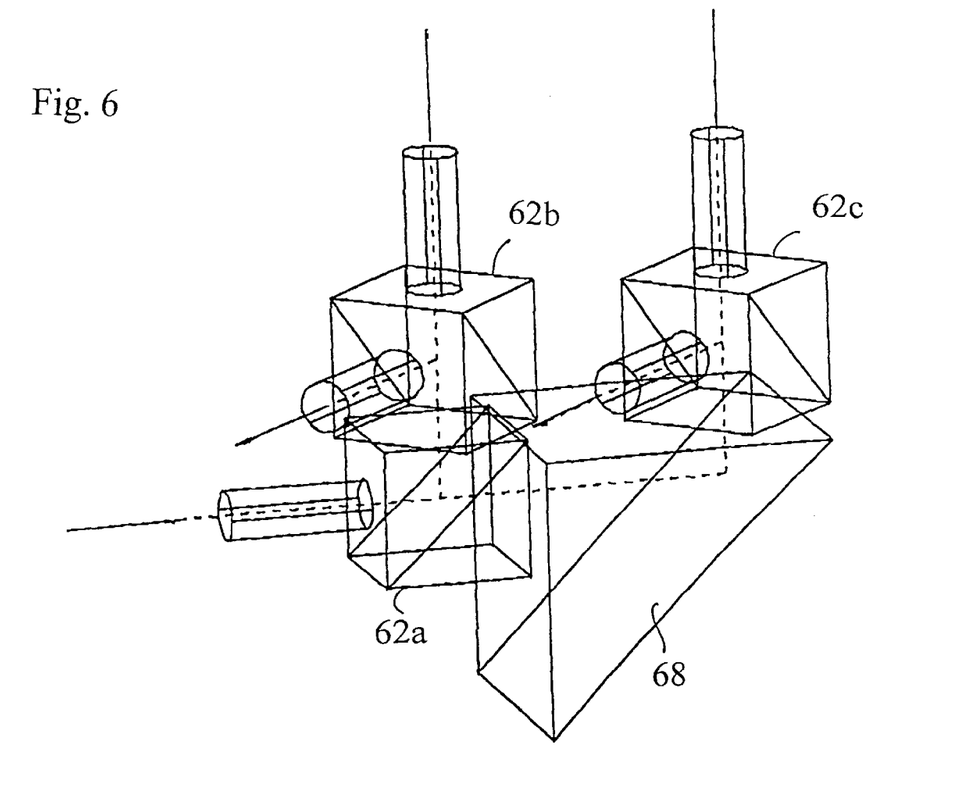

Of course, numerous other embodiments of the invention may be envisaged, without departing from the spirit and scope of the invention. For example, FIG. 6 illustrates another embodiment wherein three beam splitting cubes 62a, 62b, and 62c are oriented in a predetermined manner and optically coupled to a prism 68.

What is claimed is:

1. A method of determining a state of polarization of a beam of light comprising the steps of:
   a) providing a first beam;
   b) dividing the first beam into two sub-beams;
   c) dividing each of the two sub-beams into two further sub-beams to obtain four sub-beams of light, wherein at least one of the dividing steps (b) or (c) is performed in a polarization dependent manner;
   d) passing a first of the four sub-beams of light through a polarizing element to obtain a first polarized beam of light;
   e) passing a second of the four sub-beams of light to a phase retarding element for altering relative phase between orthogonal components of the second of the four sub-beams of light and subsequently passing said beam through a polarizing element to obtain a second polarized beam of light;
   f) detecting the intensity of the first polarized beam, the second polarized beam, and the two remaining sub-beams; and,
   g) in dependence upon the detected intensities and properties of the optical system determining the state of polarization of the input beam.

2. A method as defined in claim 1, wherein step (h) includes the step of solving a system of equations that characterize the optical system in dependence upon the detected intensities.

3. A method as defined in claim 2 wherein the step of passing one of the four sub-beams of light to a phase retarding element as defined in step (f) includes the step of reflecting the light at an interface at an angle greater or equal to a critical angle sufficient to provide total internal reflection to achieve a phase offset between orthogonal polarization components of the sub-beam via total internal reflection.

4. A method as defined in claim 2 wherein the step of passing one the of the four sub-beams of light to a phase retarding element as defined in step (f) further comprises the step of passing said light through a waveplate to achieve a phase offset between orthogonal polarization components of the sub-beam.

5. A method as defined in claim 2, wherein a Mueller formalism is used to define the system of equations using a 4-dimensional state of polarization.

6. A method of determining a state of polarization of a beam of light comprising the steps of:
   a) providing a first beam;
   b) dividing the first beam into two sub-beams;
   c) dividing each of the two sub-beams into two further sub-beams to obtain four sub-beams of light, wherein the step of dividing in at least (b) or (c) is performed in a polarization dependent manner;
   d) causing a phase retardation in any of the four sub-beams;
   e) detecting the intensity of the each of the four sub-beams; and,
   f) in dependence upon the detected intensities solving a system of equations that characterize the optical system to determine the state of polarization of the input beam.

7. A method of determining a state of polarization of a beam of light as defined in claim 6 wherein the step of causing a phase retardation includes the step of:
   reflecting the at least one of the sub-beams at an interface at an angle equal to or greater than critical angle to achieve a phase offset between orthogonal polarization components of the at least one of the sub-beams via total internal reflection.

8. A method of determining a state of polarization of a beam of light as defined in claim 7 wherein the phase retardation is achieved by passing the at least a sub-beam into a prism so that the beam can reflect off surfaces of the prism.

9. A method of determining a state of polarization of a beam of light as defined in claim 8 wherein the at least a sub-beam undergoes one or more total internal reflections off faces of the prism.

10. A device for measuring the state of polarization of a first beam of light comprising an optical system including:
   a) a first beam splitter for dividing the first beam into two sub-beams of light;

b) a second beam splitter for dividing each of the two sub-beams into two further sub-beams to obtain four sub-beams of light, wherein at least the first or the second beam splitter provides beam splitting in a polarization dependent manner;

c) a phase retarding interface for phase retarding at least one of the sub-beams of light, and the device comprising d) detectors for detecting the intensity of the sub-beams of light; and, e) electronic processing means coupled with the detectors for solving a system of equations that characterize an aspect of the optical system to determine the state of polarization of the input beam in dependence upon the detected intensities.

11. A device for measuring the state of polarization of a first beam of light as defined in claim 10 further comprising:

d) a polarizing filter to obtain a first polarized beam of light from a first of the four sub-beams of light;

e) a polarizing element optically coupled with the phase retarding interface for receiving a second of the four sub-beams of light to obtain a second phase shifted polarized beam of light.

12. A device as defined in claim 11 wherein the phase retarding interface is a waveplate.

13. A device as defined in claim 10 wherein the phase retarding interface induces a phase delay between two orthogonal components of polarized light.

14. A device as defined in claim 10, wherein the phase retarding interface is for providing circular or elliptically polarized light.

15. A device for measuring the state of polarization of an input beam of light comprising:

a) a beam splitting interface for dividing the first beam into two sub-beams $\alpha_1$ and $\alpha_2$ in a polarization dependent manner;

b) a beam splitting interface for dividing the sub-beam $\alpha_1$ into two further sub-beams $\beta_1$ and $\beta_2$ in a polarization dependent manner;

c) a beam splitting interface for dividing the sub-beam $\alpha_2$ into two further sub-beams $\gamma_1$ and $\gamma_2$ in a polarization dependent manner;

d) a phase retarding interface for phase retarding the sub-beam $\alpha_2$;

e) detectors for detecting the intensity of the sub-beams of light $\beta_1$, $\beta_2$, $\gamma_1$, $\gamma_2$; and, f) electronic processing means coupled with the detectors for solving a system of equations that characterize an aspect of the input light to determine the state of polarization of the input beam in dependence upon the detected intensities.

16. A device as defined in claim 15, wherein the phase retarding interface includes a prism.

17. A device as defined in claim 16, wherein the prism is oriented in such a manner as to cause the sub-beam $\alpha_2$ propagating therein, to be reflected in two different planes of incidence.

* * * * *

UNITED STATES PATENT AND TRADEMARK OFFICE
CERTIFICATE OF CORRECTION

PATENT NO. : 6,043,887
DATED : March 28, 2000
INVENTOR(S) : Allard et al.

It is certified that error appears in the above-identified patent and that said Letters Patent is hereby corrected as shown below:

On the Title page, last line, reads "polarization the input beam: and should read -- polarization of the input beam--.

Column 3, Line 65, "give" should read --given--

Column 8 line 8 reads "two time" and should read --two times--.

Column 10 claim 2, line 9 reads "step (h)" and should read --step (g)--

Column 10 claim 3 line 15 reads "step (f)" and should read --step (e)--

Column 10 claim 4 line 23 reads "step (f)" and should read --step (e)--

Signed and Sealed this

Sixth Day of March, 2001

Attest:

NICHOLAS P. GODICI

*Attesting Officer*         *Acting Director of the United States Patent and Trademark Office*